US005806014A

United States Patent [19]

Remboski et al.

[11] Patent Number: 5,806,014

[45] Date of Patent: Sep. 8, 1998

[54] COMBUSTION CONTROL OF AN INTERNAL COMBUSTION ENGINE PROXIMATE AN EXTINCTION LIMIT

[75] Inventors: Donald J. Remboski, Dearborn; Steven L. Plee, Brighton; Marvin L. Lynch, Detroit; Michael A. McClish, Northville, all of Mich.

[73] Assignee: Motorola Inc., Schaumburg, Ill.

[21] Appl. No.: 967,116

[22] Filed: Nov. 12, 1997

Related U.S. Application Data

[63] Continuation of Ser. No. 432,345, May 1, 1995, abandoned.

[51] Int. Cl.[6] .......................... G01M 15/00; G06F 15/00

[52] U.S. Cl. .......................... 701/111; 701/111; 701/104; 701/108; 701/110; 123/419; 123/422; 123/672

[58] Field of Search .................................... 701/101, 102, 701/103, 104, 108, 110, 111; 123/419, 422, 423, 672; 73/116, 117.3

[56] References Cited

U.S. PATENT DOCUMENTS

| | | | |
|---|---|---|---|
| 3,872,846 | 3/1975 | Taplin et al. | 123/425 |
| 4,002,155 | 1/1977 | Harned et al. | 123/425 |
| 5,237,504 | 8/1993 | Holmes et al. | 364/431.08 |
| 5,237,862 | 8/1993 | Mangrulkar et al. | 73/116 |
| 5,313,826 | 5/1994 | Klauber et al. | 73/118.1 |
| 5,333,585 | 8/1994 | Kuroda | 123/339.11 |
| 5,353,634 | 10/1994 | Baba et al. | 73/116 |
| 5,515,720 | 5/1996 | Remboski, Jr. et al. | 73/116 |
| 5,528,931 | 6/1996 | James et al. | 73/117.3 |

*Primary Examiner*—Tan Q. Nguyen
*Attorney, Agent, or Firm*—Nicholas C. Hopman

[57] ABSTRACT

A method and system of combustion control for an internal combustion engine (313) proximate an extinction limit includes measurement of acceleration behavior of the internal combustion engine and providing a measure of combustion variability dependent thereon. Preferably, the combustion variability measure is derived by one or more stochastically based methods (607). Operation of the internal combustion engine (313) is controlled dependent on the combustion variability measurement. Fuel, ignition, and exhaust gas recirculation may all be controlled by the derived combustion variability measurement to significantly reduce hydrocarbon (HC) and $NO_x$ emissions.

14 Claims, 2 Drawing Sheets

-PRIOR ART-

COMBUSTION CONTROL OF AN INTERNAL COMBUSTION ENGINE PROXIMATE AN EXTINCTION LIMIT

This is a continuation of application Ser. No. 08/432,345, filed May 1, 1995 and now abandoned.

FIELD OF THE INVENTION

This invention is generally directed to the field of internal combustion engine control and specifically for controlling combustion of an internal combustion engine proximate an extinction limit.

BACKGROUND OF THE INVENTION

Emissions legislation has mandated a substantial reduction in emission of unburned hydrocarbons (HC), carbon monoxide (CO), and oxides of nitrogen ($NO_x$) from vehicular based engines in the near future. Low Emissions Vehicles (LEVs) are currently being developed to meet these standards. Yet more difficult with ULEV (Ultra LEVs) on the horizon, a reduction of 10:1 in HC and 2:1 in $NO_x$ are required.

To achieve these types of reductions in emissions using an internal combustion engine, it is virtually necessary to burn leaner air-fuel mixtures, and/or in some cases use substantial EGR (Exhaust Gas Recirculation). When engine operation is controlled near its extinction limit, either via a lean air-fuel mixture or near an EGR dilution limit, combustion becomes increasingly unstable. Contemporary engine control systems use closed loop air-fuel ratio control to run engines. To burn leaner air-fuel mixtures, or mixtures diluted with EGR, a measure of combustion stability has proven useful to avoid misfiring conditions. Operation near the EGR dilution limit is necessary to reduce $NO_x$ emissions during warmed-up operation. This type of operation is usually found in conditions that use high EGR dilution. In another strategy operation near the lean air-fuel ratio limit is important during cold-start conditions to reduce HC emissions.

When combustion approaches the extinction limit, variability of combustion performance from cycle to cycle and increases. This variability produces fluctuation in torque that are not characteristic of stable combustion. This instability is commonly referred to as CBCV or cycle-by-cycle-variation. Operating internal combustion engines near the extinction limit has been difficult because the limits are somewhat variable and difficult to predict precisely. The penalty for exceeding the extinction limit is causing a combustion misfire—which will cause an unacceptable increase in HC emissions.

Prior art schemes have used various in-cylinder combustion sensors to detect individual cylinder combustion stability. In-cylinder sensor technologies used include optical sensors, pressure sensors, and RF (Radio Frequency) type sensors. A substantial drawback of this approach is that a sensor per cylinder is required. This approach is not only complex to manufacture and install but costly and has poor field reliability. Aside from the number of sensors per engine required these sensors are very difficult and expensive to make, and are not robust enough to survive a typical automotive environment.

Another approach is to use an exhaust gas sensor to trim air-fuel ratio. These sensors are not effective during a cold-start operation. So, a rich air-fuel mixture is dumped into the combustion chambers until the engine is warmed up—then the exhaust gas sensor is used to control the air-fuel ratio. An example of this behavior is shown in FIG. 1. Notice that the exhaust gas HC concentration shown by curve 101 decreases markedly after the 20 second point. This decrease in HC concentration happens after the exhaust gas oxygen (EGO) sensor is warm enough to operate and allow the engine control to regulate the air-fuel mixture to stoichiometric. Engine operation before the EGO sensor activates is a major source of hydrocarbon emissions.

What is needed is an improved approach for combustion control for operating an internal combustion engine proximate an extinction limit.

DETAILED DESCRIPTION OF A PREFERRED EMBODIMENT

A method and system of combustion control for an internal combustion engine proximate an extinction limit includes measurement of acceleration behavior of the internal combustion engine and providing combustion variability signal, or cycle-by-cycle variability (CBCV) signal dependent on the acceleration measurement. Preferably, the combustion variability signal is derived by one or more stochastically based methods. Operation of the internal combustion engine is controlled dependent on the combustion variability signal. This includes control of air-fuel mixture, ignition timing, and exhaust gas recirculation (EGR). Fuel is controlled principally in a cold-start condition to reduce HC emissions, and EGR and ignition timing is typically used in a lean or EGR dilute-cruise mission to reduce $NO_x$ emissions. Before the stochastic signal processing can be applied the acceleration measurement includes a substantial amount of signal conditioning to improve signal fidelity through removal of various acceleration behaviors unrelated to measuring CBCV.

In a fuel control example, fuel sprayed into a combustion chamber can be metered proportional to the combustion variability (CBCV) signal. So, when the CBCV signal indicates a high variability, as measured by a metric such as skewness, the fuel quantity can be increased in an attempt to stabilize the combustion process.

Figure 1:
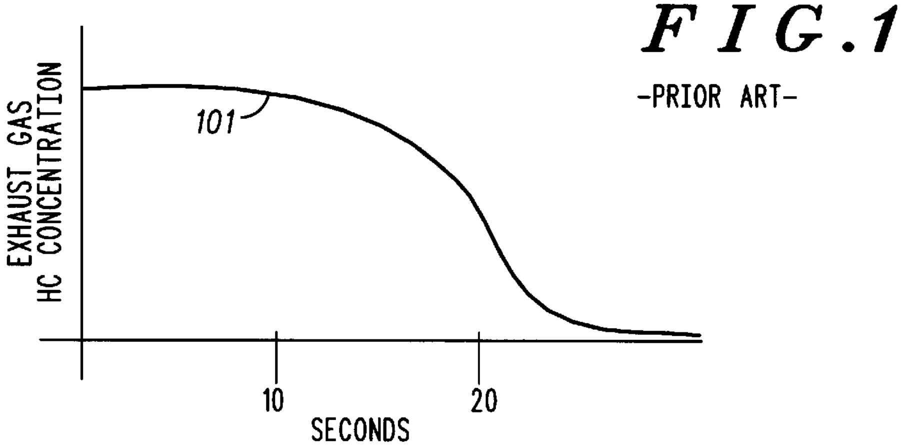
FIG. 1 is an illustration of a prior art hydrocarbon emissions profile.
Figure 2:
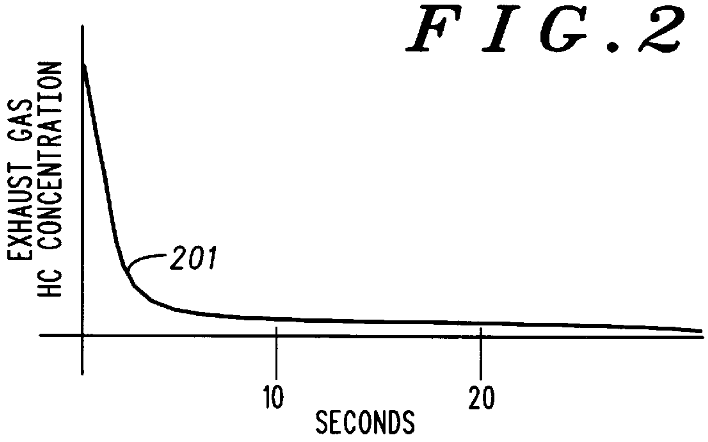
FIG. 2 is an illustration of an improved HC profile resulting from application of a preferred embodiment of the invention.

FIG. 2 illustrates an improved HC (hydrocarbon) profile achievable with application of the invention to fuel control in a cold start condition as described in the Background . Note that the exhaust gas HC concentration shown by curve 201 decreases markedly after about 2 seconds. This decrease in HC concentration is in response to metering the fuel provided to an engine dependent on a measured CBCV signal. The significant reduction in HC emissions over time is caused by a reduction of fuel flow until the CBCV increases to a predefined level just before the engine's combustion becomes unstable. By comparison FIG. 2 shows a substantial improvement over the HC emissions behavior shown in FIG. 1 which an exhaust gas oxygen (EGO) sensor in a prior art engine control system. Next, details for constructing a preferred embodiment will be detailed.

Figure 3:
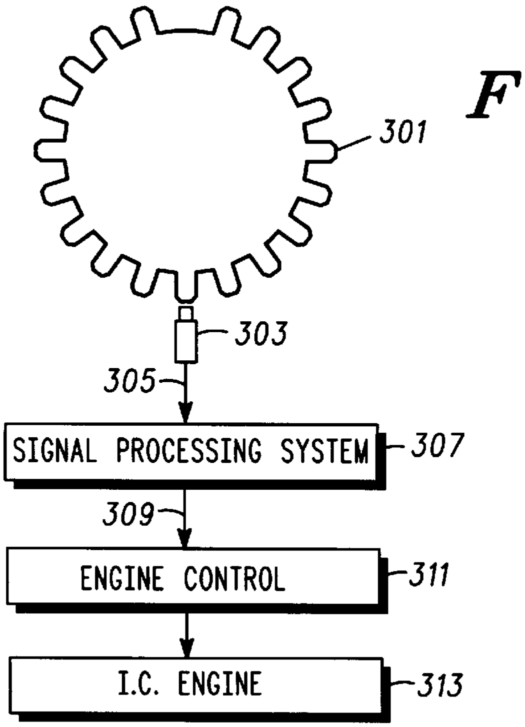
FIG. 3 is a system block diagram illustrating an overall configuration of the major elements in accordance with the preferred embodiment of the invention.

FIG. 3 is a system block diagram illustrating a general configuration for measuring an acceleration behavior of an internal combustion engine. Note that this is a preferred approach but that there are many alternative approaches that can work as well. An encoder wheel 301 is mechanically coupled to an engine's crankshaft. As the engine rotates the encoder wheel rotates and an encoder 303 senses the rotation by observing marks (encoder wheel teeth) and spaces (positioned between the encoder wheel teeth). An encoder signal 305 dependent on the sensing the marks and spaces is provided to a signal processing system 307.

The signal processing system 307 may be constructed using discrete circuitry, or using a Digital Signal Processor (DSP) such as Motorola's 56001 DSP device. In either case to effectuate the preferred method the DSP has a sub-misfire amplitude threshold memory, a misfire amplitude threshold memory, and a counter for counting a number of occurrences of transitions of an acceleration signal derived from the encoder signal 305 bounded between sub-misfire and misfire amplitude thresholds. Other stochastic signal processing can be done using the Motorola's 56001 DSP device or another general purpose signal processing capable device.

The sub-misfire amplitude threshold is determined by an engine designer and can be made to be dependent on one or more of engine speed; engine load; and optionally engine temperature. The engine speed and engine load can be measured by many mechanisms—here they are measured via the engine crankshaft encoder components 301 and 303. Engine temperature can be measured using a thermocouple—or other conventional means.

Figure 4:
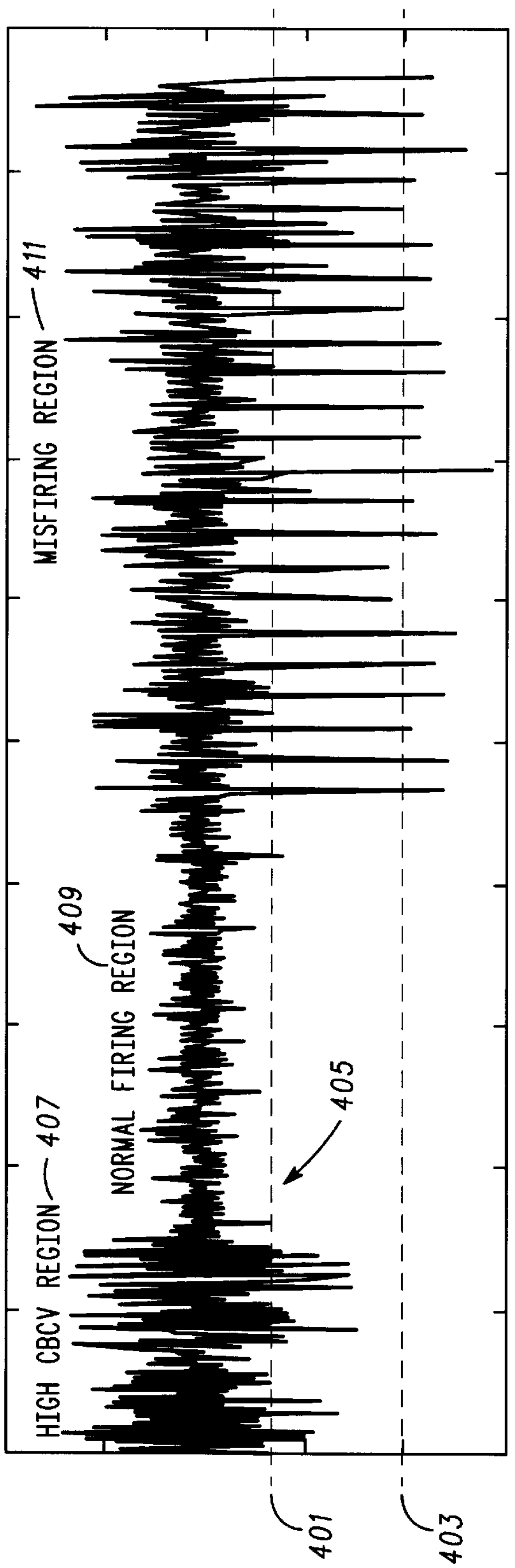
FIG. 4 is an illustration of a waveform indicative of engine combustion performance.

FIG. 4 shows an acceleration signal 405, a sub-misfire threshold 401 and a misfire threshold 403. Here the acceleration signal 405 has the behaviors unrelated to engine combustion removed from it. If the later detailed acceleration signal 405 is bounded between the sub-misfire threshold 401 and the misfire threshold 403, then combustion variability is considered marginal. Signal presence below the misfire threshold 403 indicates misfiring behavior. This misfiring behavior can be attributable to many factors including too much leaning-out of the air-fuel mixture, too much EGR, or other factors unrelated to the later-detailed closed-loop control strategies such as a fouled spark plug.

Returning to FIG. 3, the signal processing system 307 can be configured to count a number of times the measured acceleration signal 405 crosses the sub-misfire threshold 401 in a given number of engine firing events. This counted number is indicative of engine CBCV and can be used by the engine control 311 to control the air-fuel mixture. In this example the engine control 311 can adjust fuel flow, or alternatively EGR flow or spark timing to the engine 313 in order to control the CBCV within an acceptable range depending on a current mode of engine operation (cold start, warmed-up high EGR dilution, lean cruise, etc.).

Figure 5:
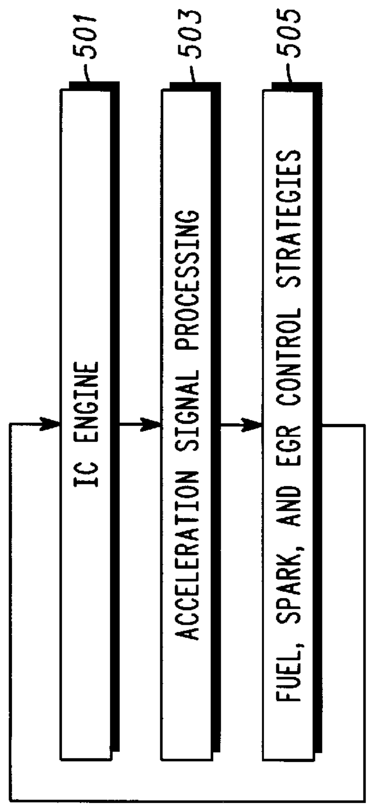
FIG. 5 is a system block diagram of a control system for implementing engine control strategies.

FIG. 5 is a system block diagram of a control system for implementing various engine control strategies described below. An acceleration signal processing block 503 measure crankshaft acceleration due to combustion of an internal combustion (IC) engine 501 The acceleration signal processing block 503 calculates a measure of CBCV based on the measured crankshaft acceleration. As mentioned earlier this measure of CBCV is passed to fuel, spark and EGR control strategies shown here at reference number 505. The control strategies adjust fuel, spark or EGR to achieve a pre-determined level of CBCV. So essentially the engine will be operated with some measure of marginality—proximate the extinction limit at which the engine would begin to misfire and where combustion would ultimately extinguish. For example, during a cold-start condition it is desirable to use a leaner air-fuel ratio to reduce hydrocarbon emissions. However, there is a limit to how lean the air-fuel ratio can go before CBCV increases to an unacceptable level. For the cold start case, the controller will adjust air-fuel ratio to hold CBCV at the maximum tolerable level as determined by the engine designer. If the CBCV increases above this level the air-fuel ratio is reduced (fuel added). If the CBCV decreases below this level the air-fuel ratio is increased (fuel subtracted). As mentioned above certain combustion and non-combustion related behavior must be removed from the encoder signal 305 before a meaningful measure of CBCV can be made. This signal processing method will be described next.

Figure 6:
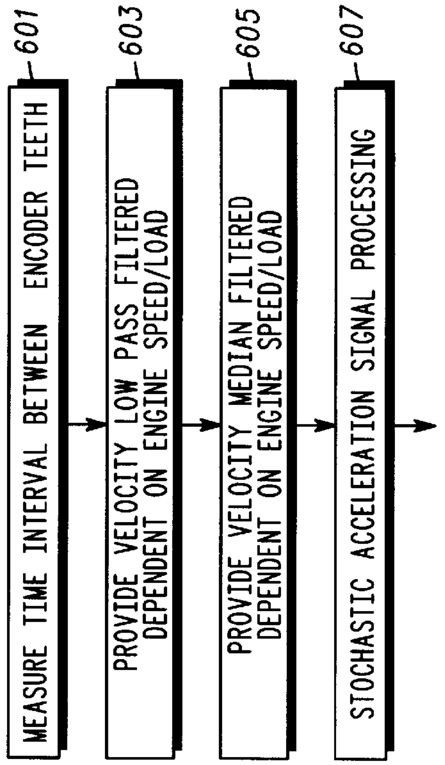
FIG. 6 is a flow chart illustrating engine acceleration signal processing steps.

FIG. 6 is a flow chart illustrating engine acceleration signal processing steps introduced in FIG. 5 in step 503. The preferred method uses a sampled-data or digitally implemented approach. The steps shown in FIG. 6 are executed with aid of a general purpose controller, embedded within the signal processing system 307 of FIG. 3, which includes DSP capability as previously noted. Preferably, the DSP is microprogrammed to execute the various steps shown. Alternatively, a hard-wired logic circuit, or other means may also be used.

Prior to the earlier-mentioned stochastic or statistical processing it is preferable to remove combustion and non-combustion related information from the encoder signal 305. Note that simple acceleration measurement schemes would be ineffective because of various combustion and non-combustion related disturbances that manifest themselves in measured acceleration data. Stochastic signal processing without removal of undesired behavior would render a poor measure of CBCV.

At a first step 601, a time interval between each of the encoder teeth, is measured as the encoder wheel 301 rotates. Then, in step 603 the measured time intervals are used to compute an angular velocity of the encoder wheel 301. Next, the angular velocity is filtered to substantially remove spectra induced by system noise, normal combustion behavior, and crankshaft torsional behavior. Preferably, this filtering operation is achieved using a lowpass filter that has filtering capability programmable dependent on measured engine load and/or engine speed. An example of this type of lowpass filter can be found in application Ser. No. 08/279,966. In the step 604 engine load is measured.

Next, in step 605 an acceleration of the encoder wheel 301 is determined dependent on the filtered velocity derived in step 603 by calculation. The acceleration is derived using a median filter. Preferably the median filter is programmable dependent on engine load and/or engine speed as described in application Ser. No. 08/279,966. A primary function of the median filter is to remove very low frequency behavior from the acceleration signal. This may include a manifestation of acceleration behavior attributable to changes in encoder wheel velocity due to driveline perturbations associated with, for instance, driving across a pothole. After the described signal processing the acceleration signal has sufficient fidelity to be stochastically processed to develop the CBCV measure.

In step 607 the stochastic processing can include derivation of mean, standard deviation, skewness and/or a measure of occurrences of the acceleration signal within a range of measured combustion behavior. The stochastic processing step 607 then outputs a combustion variability signal 609 after the stochastic processing is complete, preferably normalized dependent on the engine load measured in step 604.

As introduced above, FIG. 4 shows a processed crank acceleration signal 405 with a region of high CBCV 407, a region of normal firing (low CBCV) 409 and a region of artificially induced misfiring 411.

The table that follows summarizes the performance of three different measures of CBCV for the three different regions shown in FIG. 4. As shown below, standard deviation increases as the measured engine behavior transitions from normal firing to high CBCV, with a further small increase in the standard deviation when misfire is induced. Similarly, the skewness of the signal increases in progression from normal firing through high CBCV to misfiring. A number of sub-misfire threshold crossings per 125 firing events increases in the transition from normal firing to high CBCV. In this example the number of sub-misfire threshold crossings in the misfiring region is mostly a function of the artificially induced misfire rate and is not indicative of misfiring due to a overly lean or dilute air-fuel mixture. Another useful statistical measure is a measure of an arithmetic mean of the acceleration signal over a fixed number of firing cycles.

TABLE 1

| OPERATING CONDITION | STANDARD DEVIATION | SKEW | NUMBER OF SUB-MISFIRE THRESHOLD CROSSINGS PER 125 FIRING EVENTS |
|---|---|---|---|
| NORMAL FIRING | 8,600 | 0.01 | 0 |
| HIGH CBCV | 25,000 | 0.2 | 15 |
| MISFIRING | 29,000 | 0.3 | 6 |

Essentially the above-described statistical measurements get larger with increasing CBCV. A misfire generates the highest possible amount of CBCV. In a simple control approach, with a CBCV threshold detecting scheme, a threshold for adjusting fuel, spark or EGR should be somewhat lower than the threshold for detecting misfire. In a more sophisticated control approach a continuous adjustment is made of fuel, spark and EGR in response to the CBCV measure.

Control of the engine by the described method enables significant reduction in HC and $NO_x$ emissions. Furthermore, the described CBCV signal may be used to control individual cylinder EGR. This is important because the physical geometry of individual cylinders and their associated inlet and exhaust ports are different. Additionally, using the described CBCV signal closed loop variable valve timing could also be done.

In conclusion, an improved approach for combustion control for operating an internal combustion engine proximate an extinction limit has been detailed. The described approach provides a meaningful measure of combustion variability. The accuracy of the method is sufficient to significantly improve engine emissions performance during cold-starts, lean-cruise, and other emissions critical engine operating conditions.

What is claimed is:

1. A method of combustion control for an internal combustion engine proximate an extinction limit comprising the steps of:

measuring crankshaft acceleration behavior of the internal combustion engine, and providing a raw acceleration signal dependent thereon;

establishing a sub-misfire amplitude threshold;

establishing a misfire amplitude threshold; and analyzing behavior of the raw acceleration signal bounded between the sub-misfire and misfire amplitude thresholds and providing the combustion variability signal dependent thereon; and controlling fueling operation of the internal combustion engine dependent on the combustion variability signal.

2. A method in accordance with claim 1 wherein the sub-misfire amplitude threshold is determined dependent on one or more of engine speed, engine load; and engine temperature.

3. A method in accordance with claim 2 wherein the misfire amplitude threshold is determined dependent on one or more of engine speed; engine load; and engine temperature.

4. A method in accordance with 1 wherein the step of analyzing behavior comprises a step of:

determining a standard deviation of the raw acceleration signal and providing the combustion variability signal dependent thereon.

5. A method in accordance with 4 wherein the step of analyzing behavior comprises a step of:

measuring engine load; and wherein the step of providing the combustion variability signal provides the combustion variability signal dependent on a standard deviation of the raw acceleration signal and normalized dependent on the measured engine load.

6. A method in accordance with 1 wherein the step of analyzing behavior comprises a step of:

providing the combustion variability signal dependent on a skewness of the raw acceleration signal.

7. A method in accordance with 1 wherein the step of analyzing behavior comprises a step of:

providing the combustion variability signal dependent on a mean of the raw acceleration signal.

8. A method in accordance with claim 1 further comprising a step of:

controlling exhaust gas recirculation of the internal combustion engine dependent on the combustion variability signal.

9. A method of combustion control for an internal combustion engine proximate an extinction limit comprising the steps of:

measuring crankshaft acceleration behavior of the internal combustion engine, and providing a raw acceleration signal dependent thereon;

measuring engine load;

providing the combustion variability signal dependent on a standard deviation of the raw acceleration signal and normalized dependent on the measured engine load; and controlling an amount of fuel provided to the internal combustion engine dependent on the combustion variability signal.

10. A method of combustion control for an internal combustion engine proximate an extinction limit comprising the steps of:

measuring acceleration behavior of the internal combustion engine, and providing a raw acceleration signal dependent thereon;

measuring engine load;

providing the combustion variability signal dependent on a standard deviation of the raw acceleration signal and normalized dependent on the measured engine load; and controlling an amount of fuel provided to the internal combustion engine by reducing fuel flow until the combustion variability signal exceeds a preset limit.

11. A method of combustion control for an internal combustion engine proximate an extinction limit comprising the steps of:

measuring crankshaft acceleration behavior of the internal combustion engine, and providing a raw acceleration signal dependent thereon;

measuring engine load;

providing the combustion variability signal dependent on a standard deviation of the raw acceleration signal and normalized dependent on the measured engine load; and controlling exhaust gas recirculation of the internal combustion engine dependent on the combustion variability signal.

12. A method of combustion control for an internal combustion engine proximate an extinction limit comprising the steps of:

measuring acceleration behavior of the internal combustion engine, and providing a raw acceleration signal dependent thereon;

measuring engine load;

providing the combustion variability signal dependent on a standard deviation of the raw acceleration signal and normalized dependent on the measured engine load; and increasing exhaust gas recirculation of the internal combustion engine dependent on the combustion variability signal until the combustion variability signal exceeds a preset limit.

13. A method in accordance with claim 12 further comprising a step of:

controlling the internal combustion engine comprises controlling ignition timing of the internal combustion engine dependent on the combustion variability signal.

14. A method in accordance with claim 13 wherein the step of ignition timing of the internal combustion engine comprises advancing ignition timing of the internal combustion engine after the combustion variability signal exceeds the preset limit.

* * * * *